United States Patent Office 3,792,040
Patented Feb. 12, 1974

3,792,040
ACYL DERIVATIVES OF $O^2,2'$ - ANHYDRO-1-($\beta$-D-ARABINOFURANOSYL)-CYTOSINES AND METHODS OF PREPARING
John G. Moffatt, Los Altos, and Alan F. Russell, San Francisco, Calif., assignors to Syntex Corporation, Panama, Panama
No Drawing. Continuation-in-part of application Ser. No. 21,206, Mar. 19, 1970, now Patent No. 3,709,874. This application Mar. 3, 1972, Ser. No. 231,753
The portion of the term of the patent subsequent to Jan. 9, 1990, has been disclaimed
Int. Cl. C07d 51/52
U.S. Cl. 260—211.5 R                    10 Claims

ABSTRACT OF THE DISCLOSURE

3'-O-acyl and 3'-O-acyl-5'-O-acyl-derivatives of the salts of $O^{-2},2'$-anhyro-1-($\beta$-D-arabinofuranosyl)-cytosines and methods of preparing such compounds. The compounds are further characterized in that each compound has a higher acyl group at the 3'-O-position and/or the 5'-O-position. The compounds can be prepared by reacting the corresponding 1-($\beta$-D-ribofuranosyl) cytosine with a suitable $\alpha$-acyloxyacyl halide having the desired acyl substituent. The compounds are isolated and recovered as pharmaceutically acceptable salts and exhibits anti-viral, cytotoxic and anti-neoplastic activity, and thus are useful for the treatment of mammals where such agents are indicated. The compounds are also useful as intermediates for preparing the corresponding 1-($\beta$-D-arabinofuranosyl)-cytosines

CROSS REFERENCE TO RELATED APPLICATION

This application is a continuation-in-part of U.S. application Ser. No. 21,206, filed Mar. 19, 1970, now Pat. No. 3,709,874.

BACKGROUND OF THE INVENTION (1) Field of the invention

This invention relates to higher acyl derivatives of the salts of $O^2$,2-anhydro-1-($\beta$-D-arabinofuranosyl)-cytosines and to methods of preparing such compounds. In a further aspect this invention relates to 3'-O-higher acyl derivatives of the salts of $O^2,2'$-anhydro-1-($\beta$-D-arabinofuranosyl))-cytosines and to methods of preparing such compounds. In a still further aspect, this invention relates to 3'-D-acyl-5'-O-acyl derivatives of the salts of $O^2,2'$-anhydro-1-($\beta$-D-arabinofuranosyl)-cytosines wherein at least one of said acyl groups is a higher acyl group. This invention also relates to methods of preparing 1-($\beta$-D-arabinofuranosyl)-cytosines and derivatives and salts thereof.

(2) The prior art

In our prior application, U.S. Ser. No. 21,206, filed Mar. 19, 1970, we disclosed novel 3'-O-acyl derivatives and 3',5'-di-O-acyl derivatives of the salts of $O^2,2'$-anhydro-1-($\beta$-D-arabinofuranosyl)-cytosines, which were prepared by treatment of the appropriate cytidine derivative with a suitable $\alpha$-acyloxyacyl halide. We have now discovered 3'-O-higher acyl derivatives and 3' - O - acyl - 5' - O - acyl (wherein at least one of the acyl group is a higher acyl group) derivatives of $O^2,2'$-anhydro-1-($\beta$-D-arabinofuranosyl)-cytosines. We have further discovered that these compounds exhibit surprisingly superior anti-neoplastic activity and increased anti-viral activity relative to the corresponding lower acyl derivatives.

The salts of $O^2,2'$-anhydro-1-($\beta$-D-arabinofuranosyl)-cytosine and its 5-halo,5-lower alkyl and 5-halo(lower alkyl)-cytosine derivatives are known (note, for example, Walwick et al., Proc. Chem. Soc. 84 (1959) and U.S. Pat. No. 3,463,850). However, because of the instability under even mild basic conditions of the parent compounds, and also the relative insolubility of the salts in most inert organic solvents, these salts cannot be selectively acylated at the 3'-position by conventional nucleoside acylation procedures. For examples, treatment of the salts of $O^2,2'$-anhydro-1-($\beta$-D-arabinofuranosyl)-cytosine and their derivatives, with even such mild bases as aqueous pyridine or aqueous sodium bicarbonate-carbonate buffer, causes neutralization of the salt to give the unstable free base which decomposes with cleavage of the $O^2,2'$-anhydro linkage. Also attempted acylation with acyl anhydrides in the presence of conventional bases, such as for example pyridine, results in extensive decomposition.

SUMMARY OF THE INVENTION

In summary the compounds of our invention can be represented by the following generic formula:

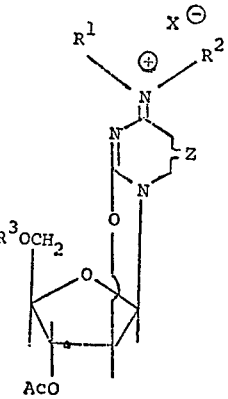

wherein $R^1$ and $R^2$ are independently selected from the group of hydrogen, lower alkyl, aryl or lower alkylaryl; Ac is a pharmaceutically acceptable acyl group having from 2 through 30 carbon atoms; $R^3$ is H or pharmaceutically acceptable acyl group having from 2 through 30 carbon atoms and wherein when Ac is an acyl group having from 2 through 21 carbon atoms then $R^3$ is a pharmaceutically acceptable acyl group having from 13 through 30 carbon atoms, and wherein when $R^3$ is H or an acyl group having from 2 through 12 carobn atoms then Ac is a pharmaceutically acceptable acyl group having from 22 through 30 carbon atoms; X is a pharmaceutically acceptable anion; and Z is the group

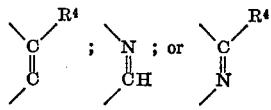

wherein $R^4$ is hydrogen, halo, lower alkyl, lower hydroxyalkyl, trifluoromethyl, azido, nitro, amino, lower alkylamino, or acylamino and $R^5$ is hydrogen or methyl and wherein when Z is

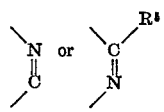

then $R^1$ and $R^2$ are independently selected from the group of hydrogen or lower alkyl.

In summary, the process, according to our invention of preparing the chloride, bromide, and iodide salt compounds of Formula I, comprises treating the corresponding cytosine ribonucleosides or suitable derivatives thereof with a suitable $\alpha$-acyloxyacyl halide having the desired higher acyl group. The resulting products of Formula I can be separated and further purified by any suitable method, such as, for example, liquid-liquid extraction and/ or crystallization. The compounds of Formula I can also be prepared according to the methods described in the copending application by J. G. Moffatt, filed on even date herewith. The fluoride salt compounds, and preferably also the iodide salt compounds, of Formula I can be prepared from the corresponding chloride or bromide salt compounds of Formula I by ion exchange with the desired fluoride or iodide ion. Similarly, other pharmaceutically acceptable salts can also be prepared by ion exchange with the particular desired pharmaceutically acceptable ion.

In summary the compounds of Formula I can be converted to the corresponding 1-(β-D-arabinofuranosyl)-cytosines, according to our invention via alkaline hydrolysis by treatment with a suitable basic solution.

The invention will be further described hereinbelow.

FURTHER DESCRIPTION OF THE INVENTION AND PREFERRED EMBODIMENTS

The compounds of our invention can be represented by the following sub-generic formula:

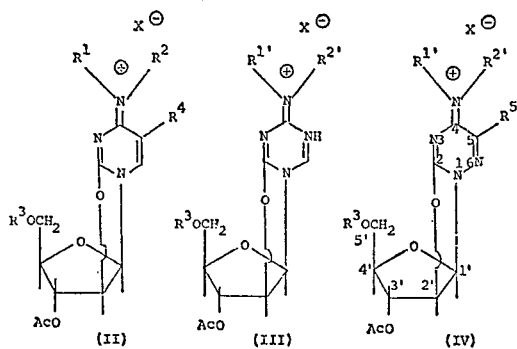

wherein $R^1$ and $R^2$ are independently selected from the group of hydrogen, lower alkyl, aryl, or lower alkylaryl; $R^{1'}$ and $R^{2'}$ are independently selected from the group of hydrogen and lower alkyl; Ac is a pharmaceutically acceptable acyl group having from 2 through 30 carbon atoms; $R^3$ is H or pharmaceutically acceptable acyl group having from 2 through 30 carbon atoms and wherein when Ac is an acyl group having from 2 through 21 carbon atoms then $R^3$ is a pharmaceutically acceptable acyl group having from 13 through 30 carbon atoms, and wherein when $R^3$ is H or an acyl group having from 2 through 12 carbon atoms then Ac is a pharmaceutically acceptable acyl group having from 22 through 30 carbon atoms; $R^4$ is hydrogen, halo, lower alkyl, lower hydroxyalkyl, trifluoromethyl, azido, nitro, amino, lower alkylamino, lower dialkylamino or acylamino; $R^5$ is hydrogen or methyl; and X is a pharmaceutically acceptable anion.

As used hereinabove and below the following terms have the following meanings unless expressly stated to the contrary.

The term pharmaceutically acceptable acyl groups refers to acyl groups having from 2 through 30 carbon atoms, which are pharmaceutically compatible with respect to toxicity and general pharmacological properties. The term includes both saturated and unsaturated acyl groups and includes straight chain, branched chain, cycloalkyl, aromatic and heterocyclic acyl groups. The acyl group can also be optionally substituted with from 1 through 5 non-carbon substituents, preferably selected from the group of fluoro, chloro, bromo, iodo, nitro, methoxyl, alkoxycarbonyl and cyano. Suitable pharmaceutically acceptable acyl groups thus include, for example, acetyl, butyryl, palmitoyl, octanoyl, undecenoyl, benzoyl, p-chlorobenzoyl, p-nitrophenylacetyl, phenylacetyl, stearoyl, oleoyl, arachidoyl, cerotolyl, lignoceroyl, behenoyl, adamantoyl, 4-methylbicyclo-[2,2,2]-oct-2-enylcarbonyl, cyclopropanecarbonyl, cyclohexylacetyl, furoyl, thiophenoyl, nicotinyl, mesitoyl, acrylyl, vinylacetyl, oleyl, dichloroacetyl, trifluoroacetyl, α-bromocyclohexanecarbonyl, methoxyacetyl, β-acetoxypropionylcyanoacetyl, p-nitrobenzoyl and the like.

The term aryl refers to groups containing an aromatic ring such as, for example, phenyl and substituted phenyls, and having about from 6 to 20 carbon atoms. The term lower alkylaryl refers to groups having an aromatic ring containing 1 or more lower alkyl substituents and having a total (ring+alkyl) of 5 to 30 carbon atoms. Attachment of the alkylaryl group to the nucleoside group is via attachment through the alkyl substitutent.

The term lower alkyl refers to alkyl groups having about from 1 through 6 carbon atoms, and includes both straight and branched chain groups. The term hydroxyalkyl refers to lower alkyls having one or more hydroxy substituents.

The term acylamino refers to the group having the formula

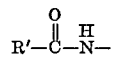

wherein R' is hydrogen, alkyl groups having from 1 through 10 carbon atoms, aryl (as defined hereinabove) or alkylaryl (as defined hereinabove). The term alkyl amino refers to the group

wherein at least one of R' or R'' is lower alkyl and the other is lower alkyl or hydrogen. The term lower dialkylamino refers to the group

wherein R' and R'' are independently selected from the group of lower alkyls.

The term halo refers to the group of fluoro, chloro, bromo and iodo. Correspondingly the term halide refers to the group of fluoride, chloride, bromide and iodide.

The term heterocyclic refers to both saturated and unsaturated heterocyclic compounds containing one or two hetero ring atoms independently selected from the group of oxygen, nitrogen and sulfur, and having about from 5 through 7 ring atoms. Typical heterocyclic groups include, for example, thienyl, pyrrolyl; furyl; pyrazolyl; thiazolyl; morpholino; piperidinyl; piperazinyl; and the like. The term pharmaceutically acceptable anion refers to anions which do not significantly adversely affect pharmaceutical properties such as, for example, derived from inorganic or organic acids such as, for example, hydrofluoric, hydrobromic, hydroiodic, sulfuric, phosphoric, lactic, benzoic, acetic, propionic, maleic, malic, tartaric, citric, succinic, ascorbic; acids and the like. Preferred pharmaceutically acceptable anions include bromide, chloride, sulfate, phosphate, acetate, lactate and the like, and especially chloride.

All temperatures and temperature ranges refer to the centigrade scale and the term ambient temperature or room temperature refers to about 20° C.

Typical non-limiting illustrations of the compounds of Formulas II, III, and IV of the invention can, for example, be had herein below by reference to the examples.

In terms of ease of preparation, the preferred compounds of the invention are the 3'-O-acyl ($R^3$ is hydrogen) derivatives and the symmetrical 3',5'-di-O-acyl derivatives (i.e., identical acyl groups are at both the 3'-O- and 5'-O-position—e.g., 3',5'-di-O-behenoyl). With respect to the 3'-O-acyl-5'-O-acyl derivatives, the 3'-O-acetyl-5'-O-acyl and 3'-O-propionyl-5'-O-acyl are preferred in terms of ease of preparation.

The pharmaceutically acceptable salts of the following compounds are especially preferred.

$O^2,2'$-anhydro-1-(3'-O-behenoyl-β-D-arabinofuranosyl)-cytosine;

$O^2,2'$-anhydro-1-(3'-O-lignoceroyl-β-D-arabinofuranosyl)-cytosine;

$O^2,2'$-anhydro-1-(3'-O-cerotoyl-β-D-arabinofuranosyl)-cytosine;

$O^2,2'$-anhydro-1-(3',5'-di-O-myristoyl-β-D-arabinofuranosyl)-cytosine;

$O^2,2'$-anhydro-1-(3',5'-di-O-palmitoyl-β-D-arabinofuranosyl)-cytosine;

$O^2,2'$-anhydro-1-(3',5'-di-O-stearoyl-β-D-arabinofuranosyl)-cytosine;

$O^2,2'$-anhydro-1-(3',5'-di-O-oleoyl-β-D-arabinofuranosyl)-cytosine;

$O^2,2'$-anhydro-1-(3',5'-di-O-arachidoyl-β-D-arabinofuranosyl)-cytosine;

$O^2,2'$-anhydro-1-(3',5'-di-O-behenoyl-β-D-arabinofuranosyl)-cytosine;

$O^2,2'$-anhydro-1-(3',5'-di-O-cerotoyl-β-D-arabinofuranosyl)-cytosine;

$O^2,2'$-anhydro-1-(3',5'-di-O-chaulmoogroyl-β-D-arabinofuranosyl)-cytosine;

$O^2,2'$-anhydro-1-(3',5'-di-O-lignoceroyl-β-D-arabinofuranosyl)-cytosine;

$O^2,2'$-anhydro-1-(3'-O-acetyl-5'-O-myristoyl-β-D-arabinofuranosyl)-cytosine;

$O^2,2'$-anhydro-1-(3'-O-acetyl-5'-O-palmitoyl-β-D-arabinofuranosyl)-cytosine;

$O^2,2'$-anhydro-1-(3'-O-acetyl-5'-O-stearoyl-β-D-arabinofuranosyl)-cytosine;

$O^2,2'$-anhydro-1-(3'-O-acetyl-5'-O-chaulmoogroyl-β-D-arabinofuranosyl)-cytosine;

$O^2,2'$-anhydro-1-(3'-O-acetyl-5'-O-behenoyl-β-D-arabinofuranosyl)-cytosine;

$O^2,2'$-anhydro-1-(3'-O-acetyl-5'-O-arachidoyl-β-D-arabinofuranosyl)-cytosine;

$O^2,2'$-anhydro-1-(3'-O-acetyl-5'-O-lignoceroyl-β-D-arabinofuranosyl)-cytosine; and $O^2,2'$-anhydro-1-(3'-O-acetyl-5'-O-cerotoyl-β-D-arabinofuranosyl)-cytosine.

The process of our invention for preparing the compounds of our invention can be represented by the following schematic reaction equation:

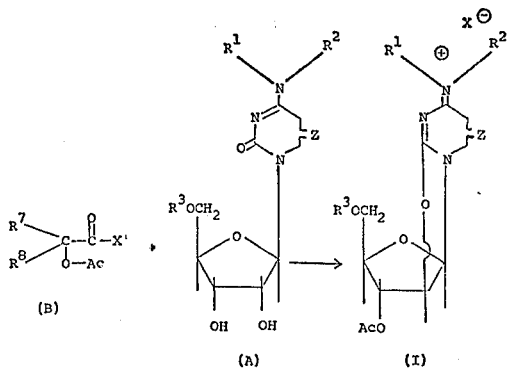

wherein $R^7$ and $R^8$ are independently selected from the group of lower alkyl, aryl, or lower alkylaryl and wherein when one of $R^7$ or $R^8$ is aryl or lower alkylaryl the other can also be hydrogen; X' is chloride, bromide or iodide; and Ac, $R^1$, $R^2$, $R^3$, Z, $R^4$, $R^5$ and $R^6$ have the same meaning as set forth.

Considering the above process in greater detail, the halide salt compounds of Formula I, other than fluoride salt compounds, are prepared according to our invention by treating the corresponding compounds of Formula A with an α-acyloxyacyl chloride, bromide or iodide of Formula B having the Ac acyl substituent desired at the 3'-O-position of the compound of Formula I. Typically, the treatment is conducted in an inert organic solvent at temperatures in the range of about from 0° to 150° C. for about from 5 minutes to 24 hours, with best results being obtained with temperatures in the range of about from 20 to 100° C. and treatment durations in the range of about from 10 to 20 hours. Longer treatment durations are typically required with lower treatment temperatures. Also typically, the higher temperature ranges and treatment durations are used for the higher acyl derivatives.

The relative ratio of reactants is typically in the range of about from 1 to 5 moles of α-acyloxy acid halide (Formula B) per mole of cytidine compound (Formula A), though mole ratios both above and below this can be used. Best results are obtained with mole ratios in the range of about from 2 to 4 moles of α-acyloxyacid halide (Formula B) per mole of cytidine compound (Formula A). In terms of ease of preparation and convenience of isolation of the cyclocytidine products, we have found that best results are obtained by preparing the chloride or bromide salts of Formula I. Suitable inert organic solvents which can be used include, for example, acetonitrile, nitromethane, glacial acetic acid, chloroform, 1,2-dimethoxyethane, dimethylformamide, dimethyl carbonate and the like. Generally, we have found particularly good results to be obtained using acetonitrile, especially where separation or isolation of the cyclocytidine halide salt product (Formula I) is desired, as we have found that many cyclocytidine halide salts typically crystallize out in this solvent, thereby permitting easy separation from residual reactants and by-products by simple decantation or filtration. In any event, regardless of whether an inert organic solvent is used, and if used, of the particular inert organic solvent used, the cyclocytidine halide salt product can be separated from the reaction mass and/or purified by any suitable procedure such as, for example, liquid-liquid extraction, precipitation, crystallization, etc., the details of which procedures are well within the scope of one having ordinary skill in the art. Illustrations of typical isolation procedures can be had by reference to the appropriate examples set forth hereinbelow.

As can be seen from the above reaction equation, the 3'-O-acyl-5'-O-acyl derivatives of Formula I can be prepared by using a 5'-O-acyl derivative as starting material (Formula A). These products are, however, preferably prepared according to the Moffatt procedure which will be subsequently described hereinbelow.

The starting materials of Formula A can be prepared according to known procedures or by obvious modifications of such procedures. Further information regarding the starting materials and their preparation can, for example, be obtained from the literature wherein many such processes are either expressly outlined or would be apparent to one having ordinary skill in the art, note for example, The Chemistry of Nucleosides and Nucleotides, A. M. Michelson, Academic Press (1963); Synthetic Procedures in Nucleic Acid Chemistry, vol. 1, Zorbach and Tipson, John Wiley & Sons (1968); Collection of Czechoslovakian Chemical Communications, vol. 30, p. 205 (1965) and U.S. Pat. 3,282,921. Suitable cytidine or cytidine analogs and/or derivative starting materials include, for example, cytidine, 5-azacytidine; 6-azacytidine; 5-chlorocytidine; 5-bromocytidine; 5-iodocytidine; 5-trifluoromethylcytidine; 5-nitrocytidine; 5-methyl-6-azacytidine; 2-thiocytidine and the like. The 5'-O-acyl derivatives of Formula A can be prepared by acylation of the corresponding 1-(β-D-ribofuranosyl)cytosine according to conventional acylation procedures; for example by treatment of the appropriate 2',3'-O-methoxymethylidene or -isopropylidene-cytidine with an acid anhydride or acid chloride in pyridine followed by removal of the protecting group with mild acid. Removal of $N^4$-acylated by-products can be achieved by conventional purifications, such as chromatography on silicic acid and crystallization. Also where substantial amounts of N⁴-acyl derivatives are formed, they can be selectively cleaved by acidic treatment as outlined by Goody and Walker in J. Org. Chem. 36, 727 (1971).

Suitable α-acyloxyacyl halide starting materials of Formula B which can be used include, for example, 2-behenoyloxy-2-methylpropionyl chloride;
2-chaulmoogroyloxy-2-methylpropionyl chloride;
2-cerotoyloxy-2-methylpropionyl chloride;
2-myristoyloxy-2-methylpropionyl chloride;
2-oleoyloxy-2-methylpropionyl chloride;
2-palmitoyloxy-2-methylpropionyl chloride;
2-benzoyloxy-2-methylpropionyl chloride;
p-nitrophenylacetyloxy-2-methylpropionyl chloride;
2-acetoxy-2-methylpropionyl chloride;
2-butyryloxy-2-methylpropionyl chloride;
2-behenoyloxy-2-methylpropionyl bromide;
2-lignoceroyloxy-2-methylpropionyl chloride;
2-cerotoyloxy-2-methylpropionyl bromide;
2-acetoxy-2-methylpropionyl iodide;
2-butyryloxy-2-methylpropionyl iodide;
α-behenoyloxy-2-isobutyryl chloride;

and the like. Typically best results are obtained by using an α-acyloxyacyl chloride.

The α-acyloxyacyl chloride starting materials of Formula B can, for example, be prepared by acetylation and chlorination of the corresponding α-hydroxy acid. This can be conveniently effected, for example, by treating the α-hydroxy acid with an acid chloride of the formula AcCl, wherein Ac is as defined hereinabove, either alone or in an inert organic solvent such as benzene, toluene or the like, which can optionally contain a tertiary base such as pyridine, N,N-dimethylaniline or the like. The α-acyloxyacyl chloride can, for example, be prepared by treating the corresponding α-acyloxy acid with thionyl chloride or oxalyl chloride either alone or in an inert organic solvent such as methylene chloride, chloroform and the like at temperatures in the range of about from 25° to 80° C. for a period of about from 1 to 2 hours.

Additional information concerning the preparation of the α-acyloxyacyl halide starting materials of Formula B can be had by reference to the parent application U.S. Ser. No. 21,206, filed Mar. 19, 1970, wherein the same generalized procedures can be followed by substituting the desired acyl group.

As can also be seen from the above schematic reaction equation, the particular halide form of α-acyloxyacyl halide used will determine the particular quaternary halide salt form of the product (Formula I) obtained. Thus, where an α-acyloxyacyl chloride is used, the resulting quaternary chloride salt form of the compounds of Formula I will be obtained. Alternatively, the quaternary halide salts of Formula I can be converted to different halide salts by any suitable procedure for effecting the replacement or exchange of one halide with another (e.g. replacement of chloride with fluoride). We have further found that the iodide and particularly the fluoride salts of our invention are best prepared in this manner. The ion exchange can, for example, be conveniently effected by passing a solution of the halide (typically chloride or bromide) salt of Formula I through a column containing ion exchange resin in the desired halide form (fluoride or iodide).

Similarly, other pharmaceutically acceptable salts can be prepared by any suitable procedure for effecting exchange of the salt ion (i.e. X⊖) of the compound of Formula I with the desired pharmaceutically acceptable ion. Again, this can be conveniently effected through passage of a solution of the salt of Formula I through a column of ion exchange resin in the desired anion form.

The 3',5'-di-O-acyl compounds of our invention can also be prepared according to the procedure described in the copending application by J. G. Moffatt, U.S. application Ser. No. 231,754, filed on Mar. 3, 1972. This process can be represented by the following schematic overall reaction equation:

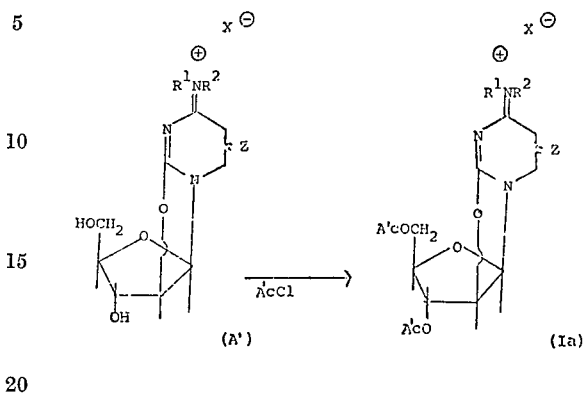

wherein A'c is a pharmaceutically acceptable acyl group having from 2 through 30 carbon atoms, and $R^1$, $R^2$, X, Z, $R^4$, $R^5$ and $R^6$ are as defined herein above.

The above process is effected by treatment of the nucleoside of Formula A with a suitable acyl chloride in a suitable inert organic solvent under acidic conditions. Also as the acyl chloride will liberate hydrogen chloride, acidic conditions can be conveniently obtained by the use of the acyl chloride in a neutral or acidic organic solvent. The acidic conditions ensure that the reaction is conducted in the absence of basic proton acceptors. This treatment is typically conducted at temperatures in the range of about from 20° to 80° C. Preferably the reaction mixture is circulated and the treatment monitored, for example, by thin-layer chromatography and continued until indicated to be substantially complete. This typically requires about from 1 to 20 days depending on the particular acyl chloride used. A mole ratio of reactants in the range of about from 2 to 100 moles of acyl chloride can be used per mole of O²,2'-anhydro nucleoside starting material (Formula A) and preferably about from 5 to 10. Further, although the above process has general applicability to the preparation of O²,2'-anhydro-1-(3',5' - di - O - acyl-β-D-arabinofuranosyl)-cytosines, in order to prepare the compounds of our invention it is of course necessary to use an acyl chloride having from 13 through 30 carbon atoms. Thus suitable acyl chlorides, which can be used include, for example, myristoyl chloride, arachidoyl chloride, behenoyl chloride, oleoyl chloride, lignoceroyl chloride, cerotoyl chloride and the like. Suitable inert organic solvents which can be used include, for example, dimethylacetamide, dimethylformamide, sulfolane, N-methylpyrrolidone and the like. Best results are typically obtained using dimethylacetamide. The starting materials of Formula A' can be prepared according to known procedures such as, for example, described in Proc. Chem. Soc., 84 (1959), and U.S. Pat. No. 3,463,850, or by obvious modifications of known procedures. These starting materials are conveniently prepared via the method described in our copending U.S. application Ser. No. 231,711, filed Mar. 3, 1972.

The resulting 3',5'-di-O-acylated product (Formula Ia) can be conveniently recovered via precipitation with a suitable organic solvent such as, for example, ethyl ether, ethyl acetate, benzene and the like, collected, and then further purified by recrystallization using a suitable solvent such as, for example, ethanol, acetonitrile, chloroform and the like. Also typically the longer chain 3',5'-di-O-acylated compounds remain insoluble in dimethylacetamide and can be conveniently removed by filtration and purified by recrystallization from a suitable solvent such as methanol.

The O²,2'-anhydro - 1 - (3' - O - acyl - 5' - O - β - D-arabinosyl)-cytosine compounds of our invention wherein the acyl group at the 3′-O- and 5′-O-positions are either the same or different can also be prepared by the procedure described in the aforementioned Moffatt patent application via treatment of the corresponding $O^2,2'$-anhydro-1-(3′-O-acyl-β-D - arabinofuranosyl)cytosine starting materials having the desired acyl substituent at the 3′-O-position with the desired acyl chloride. This can be schematically represented by the following overall reaction equation:

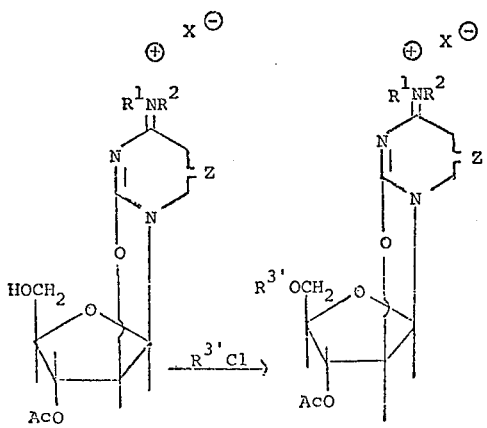

wherein $R^{3'}$ is as defined herein above for $R^3$ but cannot be hydrogen; and Ac, $R^1$, $R^2$, X, Z, $R^4$, $R^5$ and $R^6$ are as defined herein above.

This treatment can be effected by the same procedure as described above but preferably using about one-half the mole ratio of acyl chloride to nucleoside used in the treatment of the unacylated starting material. Also in this instance the limitation on the particular acyl chloride used is dictated only by the limitations imposed by the definitions of Ac and $R^3$. Thus in this case suitable acyl chlorides which can be used include, for example, acetyl chloride, myristoyl, chloride, palmitoyl chloride, stearoyl chloride, behenoyl chloride, oleoyl chloride, arachidoyl chloride, cerotoyl chloride, chaulmoogroyl chloride, adamantoyl chloride and the like. Additional examples of suitable acyl chlorides which can be used can be had by reference to Wagner and Zook, Synthetic Organic Chemistry, Chapter 17, John Wiley & Sons, New York (1953).

The compounds of our invention are also useful as intermediates and can be converted to the corresponding 1-(β-D-arabinofuranosyl)-cytosine via alkaline hydrolysis. This can be represented by the following schematic overall reaction equation:

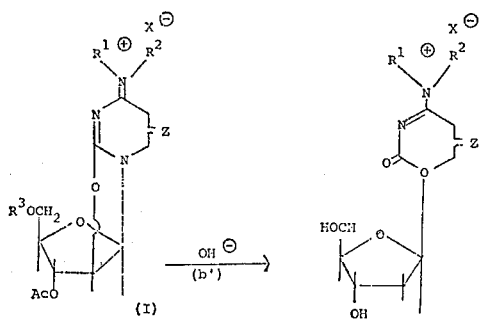

wherein Ac, $R^1$, $R^2$, $R^3$, X, Z, $R^4$, $R^5$ and $R^6$ are as defined herein above.

This hydrolysis can be conveniently effected by treating the compounds of (I) with an alkaline solution and preferably an aqueous alkali solution such as, for example, aqueous sodium hydroxide, potassium hydroxide, ammonium hydroxide, tetramethylammonium hydroxide and the like. We have also found that best results are obtained and by-products minimized by separating the cyclocytidine products from the reaction mass prior to the hydrolysis treatment. The isolation can typically be conveniently effected by liquid-liquid extraction with water and a suitable water-immiscible inert organic solvent or even by simple washing with a suitable inert organic solvent such as, for example, ethyl ether, chloroform, ethyl acetate, and the like. The hydrolysis treatment is typically conducted at temperatures in the range of about from 0° to 100° C. for about from 1 to 24 hours. Best results are obtained using temperatures in the range of about from 20° to 50° C. and treatment durations of about from 1 to 10 hours. The ratio of reactants is typically in the range of about from .1 to .5 moles of the compound of Formula I per mole of active hydroxyl, though mole ratios both above and below this can be used. Typically the relative quantity and concentration of alkaline solution will be adjusted to provide a reaction solution having a pH in the range of about 10 to 14. The resulting arabinofuranosylcytosine compounds can be separated from the reaction mass and further purified by any suitable procedure such as, for example, ion exchange chromatography, cellulose chromatography, and crystallization. Where a volatile base such as, for example ammonium hydroxide, is used, the 1-β-D-arabinofuranosylcytosine compounds can be conveniently separated from the reaction mass by vacuum evaporation of the alkaline solution, and the product residue further purified if desired by dissolution in a suitable solvent and chromatographic purification of the solution. Where a non-volatile base, such as, for example, alkali metal solution, is used, the solution should be neutralized to about pH 8 with a suitable ion exchange resin prior to evaporation.

1-β-D-arabinofuranosyl cytosines are known to be pharmaceutically useful for their anti-viral, cytotoxic and antineoplastic activities. Further information concerning the pharmaceutical application of these compounds can be had by reference to the literature of the art such as, for example, U.S. patent, 3,462,416 (note columns 5–6 and 19–20) and also Journal of Medicinal Chemistry, vol. 14, No. 9 (1971) and U.S. Pat. 3,444,294. The compounds of our invention exhibit anti-ivral activity and cytotoxic activity in mammals and are especially useful in the treatment of mammals infected with DNA viruses such as herpes, polyoma and vaccina. We have further discovered that the compounds of our invention exhibit surprisingly superior anti-neoplastic activities and increased anti-viral activities relative to the corresponding $O^2,2'$-anhydro-1-(β-D-arabinofuranosyl)-cytosine counterparts, and further that the compounds of the instant invention have superior anti-neoplastic activities even as compared with the corresponding lower acyl derivatives described in our parent application. The compounds can be administered either orally or parenterally in a suitable pharmaceutical carrier. The preferred dosage will, of course, vary with the particular subject and condition being treated, but typically will be in the range of about from 50 to 500 mg./kg. of body weight.

A further understanding of my invention can be had from the following non-limiting preparations and examples. Also where necessary, preparations and examples are repeated to provide sufficient starting material for subsequent examples.

PREPARATION I

This preparation illustrates a method of preparing hydrochloride salts of $O^2,2'$-anhydro-1-(3′-O-acyl-β-D-arabinofuranosyl)-cytosine. In this example 6.6 g. of 2-acetoxy-2-methylpropionyl chloride is added to a suspension containing 2.43 g. of cytidine in 5 ml. of anhydrous acetonitrile at 80° C. and stirred vigorously. After 30 minutes the mixture is cooled to room temperature and the resulting crystalline $O^2,2'$-anhydro-1-(3'-O-acetyl-β-D-arabinofuranosyl)-cytosine hydrochloride product is recovered by filtration, then washed with anhydrous acetone and dried in vacuo. The product residue is then further purified by crystallization from methanol by the slow addition of acetone.

By following the above procedure but using the corresponding cytidine derivatives, and in the case of slower acting derivatives increasing the reaction time to the range of about from 30 to 60 minutes, the following cyclocytidine hydrochloride salts are prepared:

$O^2,2'$-anhydro-1-(3'-O-acetyl-β-D-arabinofuranosyl)-$N^4$-methylcytosine hydrochloride;
$O^2,2'$-anhydro-1-(3'-O-acetyl-β-D-arabinofuranosyl)-$N^4$-dimethylcytosine hydrochloride;
$O^2,2'$-anhydro-1-(3'-O-ocetyl-β-D-arabinofuranosyl)-$N^4$-phenylcytosine hydrochloride;
$O^2,2'$-anhydro-1-(3'-O-acetyl-β-D-arabinofuranosyl)-5-methylcytosine hydrochloride;
$O^2,2'$-anhydro-1-(3'-O-acetyl-β-D-arabinofuranosyl)-5-hydroxymethylcytosine hydrochloride;
$O^2,2'$-anhydro-1-(3'-O-acetyl-β-D-arabinofuranosyl)-5-fluorocytosine hydrochloride;
$O^2,2'$-anhydro-1-(3'-O-acetyl-β-D-arabinofuranosyl)-5-chlorocytosine hydrochloride;
$O^2,2'$-anhydro-1(3'-O-acetyl-β-D-arabinofuranosyl)-5-bromocytosine hydrochloride;
$O^2,2'$-anhydro-1-(3'-O-acetyl-β-D-arabinofuranosyl)-5-iodocytosine hydrochloride;
$O^2,2$-anhydro-1-(3'-O-acetyl-β-D-arabinofuranosyl)-5-nitrocytosine hydrochloride;
$O^2,2'$-anhydro-1-(3'-O-acetyl-β-D-arabinofuranosyl)-5-aminocytosine hydrochloride;
$O^2,2'$-anhydro-1-(3'-O-acetyl-β-D-arabinofuranosyl)-6-azacytosine hydrochloride;
$O^2,2'$-anhydro-1-(3'-O-acetyl-β-D-arabinofuranosyl)-5-methyl-6-azacytosine hydrochloride;
$O^2,2'$-anhydro-1-(3'-O-acetyl-β-D-arabinofuranosyl)-$N^4$-methyl-6-azacytosine hydrochloride;
$O^2,2'$-anhydro-1-(3'-O-acetyl-β-D-arabinofuranosyl)-$N^4$-diethyl-6-azacytosine hydrochloride;
$O^2,2'$-anhydro-1-(3'-O-acetyl-β-D-arabinofuranosyl)-5-azacytosine hydrochloride;
$O^2,2'$-anhydro-1-(3'-O-acetyl-β-D-arabinofuranosyl)-$N^4$-methyl-5-azacytosine hydrochloride;
$O^2,2'$-anhydro-1-(3'-O-acetyl-β-D-arabinofuranosyl)-$N^4$-dimethyl-5-azacytosine hydrochloride;
$O^2,2'$-anhydro-5-(α-hydroxyethyl)-1-(3'-O-acetyl-β-D-arabinofuranosyl)-cytosine hydrochloride;
$O^2,2'$-anhydro-5-trifluoromethyl-1-(3'-O-acetyl-β-D-arabinofuranosyl)-cytosine hydrochloride;
$O^2,2'$-anhydro-5-azido-1-(3'-O-acetyl-β-D-arabinofuranosyl)-cytosine hydrochloride;
$O^2,2'$-anhydro-5-acetamido-1-(3'-O-acetyl-β-D-arabinofuranosyl)-cytosine hydrochloride;
$O^2,2'$-anhydro-5-methylamino-1-(3'-O-acetyl-β-D-arabinofuranosyl)-cytosine hydrochloride; and
$O^2,2'$-anhydro-5-trifluoromethyl-1-(3'-O-acetyl-β-D-arabinofuransoyl)-$N^4$-phenylcytosine hydrochloride.

By following the above procedure using 2-propionyloxy-2-methylpropionyl chloride, 2-butyryloxy-2 - methylpropionyl chloride and 2-octanolyloxy-2-methylpropionyl chloride in place of 2-acetoxy-2-methylpropionyl chloride, the corresponding 3'-O-propionyl-; 3'-O-butyryl-; and 3'-O-octanoyl- analogs of each of the above enumerated products are prepared.

PREPARATION 2

This preparation further illustrates methods of preparing $O^2,2'$-anhydro-1-(3'-O-acyl-β - D - arabinofuranosyl)-cytosine salts. In this preparation a mixture containing 100 mmoles of cytidine and 400 mmoles of 2-palmitoyloxy-2-methylpropionyl chloride in 200 ml. of acetonitrile is heated, with stirring, at 80° C. for 24 hours. At the end of this time the resulting precipitate is collected by centrifugation, washed thoroughly with ethyl ether and then dried under vacuum. The resulting residue is recrystallized from methanol affording pure $O^2,2'$-anhydro-1-(3'-O-palmitoyl - β-D-arabinofuranosyl)-cytosine hydrochloride. Additional product is obtained by evaporating the mother liquors to dryness, and dissolving the resulting residue in 60 ml. of methanol containing 2.55 g. of acetyl chloride. The resulting solution is allowed to stand at room temperature for one hour and then evaporated to dryness affording a residue which is triturated with ethyl ether yielding a further portion of crystalline product.

Similarly by following the same procedure as above but using the corresponding cytidine derivatives as starting material the following nucleoside hydrochloride salts are respectively prepared:

$O^2,2'$-anhydro-1-(3'-O-palmitoyl-β-D-arabinofuranosyl)-$N^4$-methylcytosine hydrochloride;
$O^2,2'$-anhydro-1-(3'-O-palmitoyl-β-D-arabinofuranosyl)-$N^4$-dimethylcytosine hydrochloride;
$O^2,2'$-anhydro-1-(3'-O-palmitoyl-b-D-arabinofuranosyl)-$N^4$-phenylcytosine hydrochloride;
$O^2,2'$-anhydro-1-(3'-O-palmitoyl-β-D-arabinofuranosyl)-5-methylcytosine hydrochloride;
$O^2,2'$-anhydro-1-(3'-O-palmitoyl-β-D-arabinofuranosyl)-5-hydroxymethylcytosine hydrochloride;
$O^2,2'$-anhydro-1-(3'-O-palmitoyl-β-D-arabinofuranosyl)-5-fluorocytosine hydrochloride;
$O^2,2'$-anhydro-1-(3'-O-palmitoyl-β-D-arabinofuranosyl)-5-chlorocytosine hydrochloride;
$O^2,2'$-anhydro-1-(3'-O-palmitoyl-β-D-arabinofuranosyl)-5-bromocytosine hydrochloride;
$O^2,2'$-anhydro-1-(3'-O-palmitoyl-β-D-arabinofuranosyl)-5-iodocytosine hydrochloride;
$O^2,2'$-anhydro-1-(3'-O-palmitoyl-β-D-arabinofuranosyl)-5-nitrocytosine hydrochloride;
$O^2,2'$-anhydro-1-(3'-O-palmitoyl-β-D-arabinofuranosyl)-5-aminocytosine hydrochloride;
$O^2,2'$-anhydro-1-(3'-O-palmitoyl-β-D-arabinofuranosyl)-6-azacytosine hydrochloride;
$O^2,2'$-anhydro-1-(3'-O-palmitoyl-β-D-arabinofuranosyl)-5-methyl-6-azacytosine hydrochloride;
$O^2,2'$-anhydro-1-(3'-O-palmitoyl-β-D-arabinofuranosyl)-$N^4$-methyl-6-azacytosine hydrochloride;
$O^2,2'$-anhydro-1-(3'-O-palmitoyl-β-D-arabinofuranosyl)-$N^4$-dimethyl-6-azacytosine hydrochloride;
$O^2,2'$-anhydro-1-(3'-O-palmitoyl-β-D-arabinofuranosyl)-5-azacytosine hydrochloride;
$O^2,2'$-anhydro-1-(3'-O-palmitoyl-β-D-arabinofuranosyl)-$N^4$-methyl-5-azacytosine hydrochloride;
$O^2,2'$-anhydro-1-(3'-O-palmitoyl-β-D-arabinofuranosyl)-$N^4$-dimethyl-5-azacytosine hydrochloride;
$O^2,2'$-anhydro-5-(α-hydroxyethyl)-1-(3'-O-palmitoyl-β-D-arabinofuranosyl)-cytosine hydrochloride;
$O^2,2'$-anhydro-5-trifluoromethyl-1-(3'-O-palmitoyl-β-D-arabinofuranosyl)-cytosine hydrochloride;
$O^2,2'$-anhydro-5-azido-1-(3'-O-palmitolyl-β-D-arabinofuranosyl)-cytosine hydrochloride;
$O^2,2'$-anhydro-5-acetamido-1-(3'-O-palmitolyl-β-D-arabbinofuranosyl)-cytosine hydrochloride;
$O^2,2'$-anhydro-5-methylamino-1-(3'-O-palmitolyl-β-D-arabinofuranosyl)-cytosine hydrochloride; and
$O^2,2'$-anhydro-5-trifluoromethyl-1-(3'-O-palmitoyl-β-D-arabinofuranosyl)-$N^4$-phenylcytosine hydrochloride.

Similarly by following the above procedure but respectively using 2-undecenoyloxy-2-methylpropionyl chloride; 2-myristoyloxy-2-methylpropionyl chloride; 2-stearoyloxy-2-methylpropionyl chloride; 2-oleoyloxy-2-methylpropionyl chloride; and 2 - chaulmoogroyloxy-2-methylpropionyl chloride in place of 2 - palmitolyloxy-2methylpropionyl chloride, the corresponding 3'-O-undecenoyl; 3'-O-myristoyl; 3'-O-stearoyl; 3'-O-oleoyl; and 3'-O-chaulmoogroyl analogs of each of the above enumerated products are respectively prepared.

PREPARATION 3

This preparation further illustrates methods of preparing $O^2,2'$-anhydro - 1 - (3'-$\beta$-acyl-$\beta$-D-arabinofuranosyl)-cytosine salts. In this preparation a mixture containing 100 mmoles of cytidine and 400 mmoles of 2-benzoyloxy-2-methylpropionyl chloride in 200 ml. of acetonitrile is heated, with stirring, at 80° C. for 24 hours. At the end of this time the resulting precipitate is collected by centrifugation, washed thoroughly with ethyl ether and then dried under vacuum. The resulting residue is recrystallized from methanol affording pure $O^2,2'$-anhydro-1-(3'-O-benzoyl-$\beta$-D-arabinofuranosyl)-cytosine hydrochloride. Additional product is obtained by evaporating the mother liquors to dryness, and the resulting residue dissolved in 60 ml. of methanol containing 2.55 g. of acetyl chloride. The resulting solution is allowed to stand at room temperature for one hour and then evaporated to dryness affording a residue which is triturated with ethyl ether yielding a further portion of crystalline product.

Similarly by following the same procedure as above but using the corresponding cytidine derivatives as starting material, the following nucleoside hydrochloride salts are respectively prepared:

$O^2,2'$-anhydro-1-(3'-O-benzoyl-$\beta$-D-arabinofuranosyl)-$N^4$-methylcytosine hydrochloride;
$O^2,2'$-anhydro-1-(3'-O-benzoyl-$\beta$-D-arabinofuranosyl)-$N^4$-dimethylcytosine hydrochloride;
$O^2,2'$-anhydro-1-(3'-O-benzoyl-$\beta$-D-arabinofuranosyl)-$N^4$-phenylcytosine hydrochloride;
$O^2,2'$-anhydro-1-(3'-O-benzoyl-$\beta$-D-arabinofuranosyl)-5-methylcytosine hydrochloride;
$O^2,2'$-anhydro-1-(3'-O-benzoyl-$\beta$-D-arabinofuranosyl)-5-hydroxymethylcytosine hydrochloride;
$O^2,2'$-anhydro-1-(3'-O-benzoyl-$\beta$-D-arabinofuranosyl)-5-fluorocytosine hydrochloride;
$O^2,2'$-anhydro-1-(3'-O-benzoyl-$\beta$-D-arabinofuranosyl)-5-chlorocytosine hydrochloride;
$O^2,2'$-anhydro-1-(3'-O-benzoyl-$\beta$-D-arabinofuranosyl)-5-bromocytosine hydrochloride;
$O^2,2'$-anhydro-1-(3'-O-benzoyl-$\beta$-D-arabinofuranosyl)-5-iodocytosine hydrochloride;
$O^2,2'$-anhydro-1-(3'-O-benzoyl-$\beta$-D-arabinofuranosyl)-5-nitrocytosine hydrochloride;
$O^2,2'$-anhydro-1-(3'-O-benzoyl-$\beta$-D-arabinofuranosyl)-5-aminocytosine hydrochloride;
$O^2,2'$-anhydro-1-(3'-O-benzoyl-$\beta$-D-arabinofuranosyl)-6-azacytosine hydrochloride;
$O^2,2'$-anhydro-1-(3'-O-benzoyl-$\beta$-D-arabinofuranosyl)-5-methyl-6-azacytosine hydrochloride;
$O^2,2'$-anhydro-1-(3'-O-benzoyl-$\beta$-D-arabinofuranosyl)-$N^4$-methyl-6-azacytosine hydrochloride;
$O^2,2'$-anhydro-1-(3'-O-benzoyl-$\beta$-D-arabinofuranosyl)-$N^4$-dimethyl-6-azacytosine hydrochloride;
$O^2,2'$-anhydro-1-(3'-O-benzoyl-$\beta$-D-arabinofuranosyl)-5-azacytosine hydrochloride;
$O^2,2'$-anhydro-1-(3'-O-benzoyl-$\beta$-D-arabinofuranosyl)-$N^4$-methyl-5-azacytosine hydrochloride;
$O^2,2'$-anhydro-1-(3'-O-benzoyl-$\beta$-D-arabinofuranosyl)-$N^4$-dimethyl-5-azacytosine hydrochloride;
$O^2,2'$-anhydro-5-($\alpha$-hydroxyethyl)-1-(3'-O-benzoyl-$\beta$-D-arabinofuranosyl)-cytosine hydrochloride;
$O^2,2'$-anhydro-5-trifluoromethyl-1-(3'-O-benzoyl-$\beta$-D-arabinofuranosyl)-cytosine hydrochloride;
$O^2,2'$-anhydro-5-azido-1-(3'-O-benzoyl-$\beta$-D-arabinofuranosyl)-cytosine hydrochloride;
$O^2,2'$-anhydro-5-acetamido-1-(3'-O-benzoyl-$\beta$-D-arabinofuranosyl)-cytosine hydrochloride;
$O^2,2'$-anhydro-5-methylamino-1-(3'-O-benzoyl-$\beta$-D-arabinofuranosyl)-cytosine hydrochloride; and
$O^2,2'$-anhydro-5-trifluoromethyl-1-(3'-O-benzoyl-$\beta$-D-arabinofuranosyl)-$N^4$-phenylcytosine hydrochloride.

Similarly by following the same procedure as above but using p-chlorobenzoyloxy-2-methylpropionyl chloride; and p-nitrophenylacetyloxy - 2 - methylpropionyl chloride in place of 2-benzoyloxy - 2 - methylpropionyl chloride, the corresponding 3'-O-(p-chlorobenzoyl)- and 3'-O-(p-nitrophenylacetyl)- analogs of each of the above enumerated products are respectively prepared.

Example 1

This example illustrates methods according to our invention of preparing $O^2,2'$-anhydro-1-(3'-O-acyl-$\beta$-D-arabinofuranosyl)-cytosine salts of our invention. In this preparation a mixture containing 100 mmoles of cytidine and 400 mmoles of 2-behenoyloxy-2-methylpropionyl chloride in 200 ml. of acetonitrile is heated, with stirring, at 80° C. for 24 hours. At the end of this time the resulting precipitate is collected by centrifugation, washed thoroughly with ethyl ether and then dried under vacuum. The resulting residue is recrystallized from methanol affording pure $O^2,2'$ - anhydro-1(3'-O-behenoyl-$\beta$-arabinofuranosyl)-cytosine hydrochloride. Additional product is obtained by evaporating the mother liquors to dryness, and dissolving the resulting residue in 60 ml. of methanol containing 2.55 g. of acetyl chloride. The resulting solution is allowed to stand at room temperature for one hour and then evaporated to dryness affording a residue which is triturated with ethyl ether yielding a further portion of crystalline product.

Similarly by following the same procedure as above but using the corresponding cytidine derivatives as starting material, the following nucleoside hydrochloride salts are respectively prepared:

$O^2,2'$-anhydro-1-(3'-O-behenoyl-$\beta$-D-arabinofuranosyl)-$N^4$-methylcytosine hydrochloride;
$O^2,2'$-anhydro-1-(3'-O-behenoyl-$\beta$-D-arabinofuranosyl)-$N^4$-dimethylcytosine hydrochloride;
$O^2,2'$-anhydro-1-(3'-O-behenoyl-$\beta$-D-arabinofuranosyl)-$N^4$-phenylcytosine hydrochloride;
$O^2,2'$-anhydro-1-(3'-O-behenoyl-$\beta$-D-arabinofuranosyl)-5-methylcytosine hydrochloride;
$O^2,2'$-anhydro-1-(3'-O-behenoyl-$\beta$-D-arabinofuranosyl)-5-hydroxymethylcytosine hydrochloride;
$O^2,2'$-anhydro-1-(3'-O-behenoyl-$\beta$-D-arabinofuranosyl)-5-fluorocytosine hydrochloride;
$O^2,2'$-anhydro-1-(3'-O-behenoyl-$\beta$-D-arabinofuranosyl)-5-chlorocytosine hydrochloride;
$O^2,2'$-anhydro-1-(3'-O-behenoyl-$\beta$-D-arabinofuranosyl)-5-bromocytosine hydrochloride;
$O^2,2'$-anhydro-1-(3'-O-behenoyl-$\beta$-D-arabinofuranosyl)-5-iodocytosine hydrochloride;
$O^2,2'$-anhydro-1-(3'-O-behenoyl-$\beta$-D-arabinofuranosyl)-5-nitrocytosine hydrochloride;
$O^2,2'$-anhydro-1-(3'-O-behenoyl-$\beta$-D-arabinofuranosyl)-5-aminocytosine hydrochloride;
$O^2,2'$-anhydro-1-(3'-O-behenoyl-$\beta$-D-arabinofuranosyl)-6-azacytidine hydrochloride;
$O^2,2'$-anhydro-1-(3'-O-behenoyl-$\beta$-D-arabinofuranosyl)-5-methyl-6-azacytosine hydrochloride;
$O^2,2'$-anhydro-1-(3'-O-behenoyl-$\beta$-D-arabinofuranosyl)-$N^4$-methyl-6-azacytosine hydrochloride;
$O^2,2'$-anhydro-1-(3'-O-behenoyl-$\beta$-D-arabinofuranosyl)-$N^4$-dimethyl-6-azacytosine hydrochloride;
$O^2,2'$-anhydro-1-(3'-O-behenoyl-$\beta$-D-arabinofuranosyl)-5-azacytosine hydrochloride;
$O^2,2'$-anhydro-1-(3'-O-behenoyl-$\beta$-D-arabinofuranosyl)-$N^4$-methyl-5-azacytosine hydrochloride;
$O^2,2'$-anhydro-1-(3'-O-behenoyl-$\beta$-D-arabinofuranosyl)-$N^4$-dimethyl-5-azacytosine hydrochloride;

O²,2'-anhydro-5-(α-hydroxyethyl)-1-(3'-O-behenoyl-
β-D-arabinofuranosyl)-cytosine hydrochloride;
O²,2'-anhydro-5-trifluoromethyl-1-(3'-O-behenoyl-β-
D-arabinofuransoyl)-cytosine hydrochloride;
O²,2'-anhydro-5-azido-1-(3'-O-behenoyl-β-D-
arabinofuranosyl)-cytosine hydrochloride;
O²,2'-anhydro-5-acetamido-1-(3'-O-behenoyl-β-D-
arabinofuranosyl)-cytosine hydrochloride;
O²,2'-anhydro-5-methylamino-1-(3'-O-behenoyl-β-
D-arabinofuranosyl)-cytosine hydrochloride; and
O²,2'-anhydro-5-trifluoromethyl-1-(3'-O-behenoyl-β-
D-arabinofuranosyl)-N⁴-phenylcytosine hydrochloride.

Similarly by following the same procedure but respectively using 2-lignoceroyloxy-2-methylpropionyl chloride and 2-cerotoyloxy-2-methylpropionyl chloride in place of behenoyloxy-2-methylpropionyl chloride, the corresponding 3'-O-lignoceroyl and 3'-O-cerotoyl analogs of each of the above enumerated products are respectively prepared.

Example 2

This example illustrates our process for preparing salts of O²,2'-anhydro-1-(3'-O-acyl - 5' - O-acyl-β-D-arabinofuranosyl)-cytosine of our invention. In this example 6.6 g. of 2-acetoxy-2-methylpropionyl chloride is added to a suspension containing 5.66 g. of 1-(5'-O-behenoyl-β-D-ribofuranosyl)-cytosine in 50 ml. of anhydrous acetonitrile at 80° C. and stirred vigorously. After 30 minutes the mixture is cooled to room temperature, 200 ml. of ether is added and the resulting O²,2'-anhydro-1-(3'-O-acetyl-5'-O-behenoyl - β - D-arabinofuranosyl)-cytosine hydrochloride product is recovered by filtration, then washed with anhydrous ether and dried in vacuo. The product residue is then further purified by crystallization from methanol.

By following the above procedure but respectively using the corresponding 1 - (5'-O-behenoyl-β-D-ribofuranosyl)-cytosine derivatives as starting materials, the following compounds are respectively prepared:

O²,2'-anhydro-1-(3'-O-acetyl-5'-O-behenoyl-β-D-arabino-
furanosyl)-N⁴-methylcytosine hydrochloride;
O²,2'-anhydro-1-(3'-O-acetyl-5'-O-behenoyl-β-D-arabino-
furanosyl)-N⁴-dimethylcytosine hydrochloride;
O²,2'-anhydro-1-(3'-O-acetyl-5'-O-behenoyl-β-D-arabino-
furanosyl)-N⁴-phenylcytosine hydrochloride;
O²,2'-anhydro-1-(3'-O-acetyl-5'-O-behenoyl-β-D-arabino-
furanosyl)-5-methylcytosine hydrochloride;
O²,2'-anhydro-1-(3'-O-acetyl-5'-O-behenoyl-β-D-arabino-
furanosyl)-5-hydroxymethylcytosine hydrochloride;
O²,2'-anhydro-1-(3'-O-acetyl-5'-O-behenoyl-β-D-arabino-
furanosyl)-5-fluorocytosine hydrochloride;
O²,2'-anhydro-1-(3'-O-acetyl-5'-O-behenoyl-β-D-arabino-
furanosyl)-5-chlorocytosine hydrochloride;
O²,2'-anhydro-1-(3'-O-acetyl-5'-O-behenoyl-β-D-arabino-
furanosyl)-5-bromocytosine hydrochloride;
O²,2'-anhydro-1-(3'-O-acetyl-5'-O-behenoyl-β-D-arabino-
furanosyl)-5-iodocytosine hydrochloride;
O²,2'-anhydro-1-(3'-O-acetyl-5'-O-behenoyl-β-D-arabino-
furanosyl)-5-nitrocytosine hydrochloride;
O²,2'-anhydro-1-(3'-O-acetyl-5'-O-behenoyl-β-D-arabino-
furanosyl)-5-aminocytosine hydrochloride;
O²,2'-anhydro-1-(3'-O-acetyl-5'-O-behenoyl-β-D-arabino-
furanosyl)-6-azacytosine hydrochloride;
O²,2'-anhydro-1-(3'-O-acetyl-5'-O-behenoyl-β-D-arabino-
furanosyl)-5-methyl-6-azacytosine hydrochloride;
O²,2'-anhydro-1-(3'-O-acetyl-5'-O-behenoyl-β-D-arabino-
furanosyl)-N⁴-methyl-6-azacytosine hydrochloride;
O²,2'-anhydro-1-(3'-O-acetyl-5'-O-behenoyl-β-D-arabino-
furanosyl)-5-azacytosine hydrochloride;
O²,2'-anhydro-1-(3'-O-acetyl-5'-O-behenoyl-β-D-arabino-
furanosyl)-N⁴-methyl-5-azacytosine hydrochloride;
O²,2'-anhydro-1-(3'-O-acetyl-5'-O-behenoyl-β-D-arabino-
furanosyl)-N⁴-dimethyl-5-azacytosine hydrochloride;

O²,2'-anhydro-5-(α-hydroxyethyl)-1-(3'-O-acetyl-5'-
O-behenoyl-β-D-arabinofuranosyl)-cytosine hydrochloride;
O²,2'-anhydro-5-trifluoromethyl-1-(3'-O-acetyl-5'-O-
behenoyl-β-D-arabinofuranosyl)-cytosine hydrochloride;
O²,2'-anhydro-5-azido-1-(3'-O-acetyl-5'-O-behenoyl-
β-D-arabinofuranosyl)-cytosine hydrochloride;
O²,2'-anhydro-5-acetamido-1-(3'-O-acetyl-5'-O-behenoyl-
β-D-arabinofuranosyl)-cytosine hydrochloride;
O²,2'-anhydro-5-methylamino-1-(3'-O-acetyl-5'-O-
behenoyl-β-D-arabinofuranosyl)-cytosine hydrochloride; and
O²,2'-anhydro-5-trifluoromethyl-1-(3'-O-acetyl-5'-O-
behenoyl-β-D-arabinofuranosyl)-N⁴-phenylcytosine hydrochloride.

By following the above procedure using 2-butyryloxy-2-methylpropionyl chloride and 2-octanoyloxy-2-methylpropionyl chloride in place of 2-acetoxy-2-methylpropionyl chloride, the corresponding 3'-O-butyryl- and 3'-O-octanoyl- analogs of each of the above enumerated products are prepared.

Example 3

This example further illustrates our method for preparing O²,2' - anhydro - 1 - (3'-O-acyl-5'-O-acyl-β-D-arabinofuranosyl)-cytosine salts of our invention. In this example a mixture containing 100 mmoles of 1-(5'-O-palmitoyl-β-D-ribofuranosyl)-cytosine and 400 mmoles of 2-benzoyloxy-2-methylpropionyl chloride in 200 ml. of acetonitrile is heated, with stirring, at 80° C. for 24 hours. At the end of this time the resulting precipitate is collected by centrifugation, washed thoroughly with ethyl ether and then dried under vacuum. The resulting residue is recrystallized from methanol affording pure O²,2'-anhydro-1-3' - O - benzoyl - 5' - O-palmitolyl-β-D-arabinofuranosyl)-cytosine hydrochloride.

Similarly by following the same procedure as above but using the corresponding 1-(5'-O-palmitoyl-β-D-ribofuranosyl)-cytosine derivatives as starting material, the following nucleoside hydrochloride salts are respectively prepared:

O²,2' - anhydro - 1 - (3' - O - benzoyl-5'-O-palmitoyl-β-D-
arabinofuranosyl)-N⁴-methylcytosine hydrochloride;
O²,2' - anhydro - 1 - (3' - O - benzoyl-5'-O-palmitoyl-β-D-
arabinofuranosyl)-N⁴-dimethylcytosine hydrochloride;
O²,2' - anhydro - 1 - (3' - O - benzoyl-5'-O-palmitoyl-β-D-
arabinofuranosyl)-N⁴-phenylcytosine hydrochloride;
O²,2' - anhydro - 1 - (3' - O - benzoyl-5'-O-palmitoyl-β-D-
arabinofuranosyl)-5-methylcytosine hydrochloride;
O²,2' - anhydro - 1 - (3' - O - benzoyl-5'-O-palmitoyl-β-D-
arabinofuranosyl)-5-hydroxymethylcytosine hydrochloride;
O²,2' - anhydro - 1 - (3' - O - benzoyl-5'-O-palmitoyl-β-D-
arabinofuranosyl)-5-fluorocytosine hydrochloride;
O²,2' - anhydro - 1 - (3' - O - benzoyl-5'-O-palmitoyl-β-D-
arabinofuranosyl)-5-chlorocytosine hydrochloride;
O²,2' - anhydro - 1 - (3' - O - benzoyl-5'-O-palmitoyl-β-D-
arabinofuranosyl)-5-bromocytosine hydrochloride;
O²,2' - anhydro - 1 - (3' - O - benzoyl-5'-O-palmitoyl-β-D-
arabinofuranosyl)-5-iodocytosine hydrochloride;
O²,2' - anhydro - 1 - (3' - O - benzoyl-5'-O-palmitoyl-β-D-
arabinofuranosyl)-5-nitrocyotosine hydrochloride;
O²,2' - anhydro - 1 - (3' - O - benzoyl-5'-O-palmitoyl-β-D-
arabinofuranosyl)-5-aminocytosine hydrochloride;
O²,2' - anhydro - 1 - (3' - O - benzoyl-5'-O-palmitoyl-β-D-
arabinofuranosyl)-6-azacytosine hydrochloride;
O²,2' - anhydro - 1 - (3' - O - benzoyl-5'-O-palmitoyl-β-D-
arabinofuranosyl)-5-methyl-6-azacytosine hydrochloride;
O²,2' - anhydro - 1 - (3' - O - benzoyl-5'-O-palmitoyl-β-D-
arabinofuranosyl)-N⁴-methyl-6-azacytosine hydrochloride;

$O^2,2'$ - anhydro - 1 - (3' - O - benzoyl-5'-O-palmitoyl-$\beta$-D-arabinofuranosyl)-$N^4$-dimethyl-6-azacytosine hydrochloride;

$O^2,2'$ - anhydro - 1 - (3' - O - benzoyl-5'-O-palmitoyl-$\beta$-D-arabinofuranosyl)-5-azacytosine hydrochloride;

$O^2,2'$ - anhydro - 1 - (3' - O - benzoyl-5'-O-palmitoyl-$\beta$-D-arabinofuranosyl)-$N^4$-methyl-5-azacytosine hydrochloride;

$O^2,2'$ - anhydro - 1 - (3' - O - benzoyl-5'-O-palmitoyl-$\beta$-D-arabinofuranosyl)-$N^4$-dimethyl-5-azacytosine hydrochloride;

$O^2,2'$-anhydro-5-($\alpha$-hydroxyethyl)-1-(3'-O-benzoyl-5'-O-palmitoyl-$\beta$-D-arabinofuranosyl)-cytosine hydrochloride;

$O^2,2'$-anhydro-5-trifluoromethyl-1-(3'-O-benzoyl-5'-O-palmitoyl-$\beta$-D-arabinofuranosyl)-cytosine hydrochloride;

$O^2,2'$-anhydro-5-azido-1-(3'-O-benzoyl-5'-O-palmitoyl-$\beta$-D-arabinofuranosyl)-cytosine hydrochloride;

$O^2,2'$-anhydro-5-acetamido-1-(3'-O-benzoyl-5'-O-palmitoyl-$\beta$-D-arabinofuranosyl)-cytosine hydrochloride;

$O^2,2'$-anhydro-5-methylamino-1-(3'-O-benzoyl-5'-O-palmitoyl-$\beta$-D-arabinofuranosyl)-cytosine hydrochloride; and $O^2,2'$-anhydro-5-trifluoromethyl-1-(3'-O-benzoyl-5'-O-palmitoyl-$\beta$-D-arabinofuranosyl)-$N^4$-phenylcytosine hydrochloride.

Similarly by following the same procedure as above but using p-chlorobenzoyloxy - 2 - methylpropionyl chloride; and p-nitrophenylacetyloxy-2-methylpropionylchloride in place of 2-benzoyloxy-2-methylpropionyl chloride, the corresponding 3'-O-(p-chlorobenzoyl)- and 3'-O-(p-nitrophenylacetyl)- derivatives of each of the above enumerated product are respectively prepared.

Example 4

This example illustrates methods of preparing the compounds of our invention, according to the Moffatt procedure previously described and cited hereinabove. In this example a suspension containing 20 mmoles of $O^2,2'$-anhydro - 1 - ($\beta$-D-arabinofuranosyl)-cytosine hydrochloride and 200 mmoles of palmitoyl chloride in 200 ml. of dimethylacetamide is stirred at 37° C. for 5 days. During this time the reaction mixture is monitored by thin-layer chromatography, using a butanol - acetic - water (5:2:3, by vol.) solvent to ensure that the reaction is essentially complete. The mixture is then cooled to 0° C., filtered and the resulting precipitate is thoroughly washed with ethyl ether and then recrystallized from methanol yielding pure $O^2,2'$-anhydro-3',5'-di-O-palmitoyl-1-($\beta$-D-arabinofuranosyl)-cytosine hydrochloride.

Similarly by following the same procedure as above but using the corresponding $O^2,2'$-anhydro-1-($\beta$-D-arabinofuranosyl)-cytosine nucleoside hydrochloride salts as starting material, the following salts are respectively prepared:

$O^2,2'$-anhydro-5-methyl-1-(3',5'-di-O-palmitoyl-$\beta$-D-arabinofuranosyl)-cytosine hydrochloride;

$O^2,2'$-anhydro-5-fluoro-1-(3',5'-di-O-palmitoyl-$\beta$-D-arabinofuranosyl)-cytosine hydrochloride;

$O^2,2'$-anhydro-5-chloro-1-(3',5'-di-O-palmitoyl-$\beta$-D-arabinofuranosyl)-cytosine hydrochloride;

$O^2,2'$-anhydro-5-bromo-1-(3',5'-di-O-palmitoyl-$\beta$-D-arabinofuranosyl)-cytosine hydrochloride;

$O^2,2'$-anhydro-5-iodo-1-(3',5'-di-O-palmitoyl-$\beta$-D-arabinofuranosyl)-cytosine hydrochloride;

$O^2,2'$-anhydro-5-palmitoyloxymethyl-1-(3',5'-di-O-palmitoyl-$\beta$-D-arabinofuranosyl)-cytosine hydrochloride;

$O^2,2'$-anhydro-5-($\alpha$-palmitoyloxyethyl)-1-(3',5'-di-O-palmitoyl-$\beta$-D-arabinofuranosyl)-cytosine hydrochloride;

$O^2,2'$-anhydro-1-(3',5'-di-O-palmitoyl-$\beta$-D-arabinofuranosyl)-5-trifluoromethylcytosine hydrochloride;

$O^2,2'$-anhydro-5-azido-1-(3',5'-di-O-palmitoyl-$\beta$-D-arabinofuranosyl)-cytosine hydrochloride;

$O^2,2'$-anhydro-5-nitro-1-(3',5'-di-O-palmitoyl-$\beta$-D-arabinofuranosyl)-cytosine hydrochloride;

$O^2,2'$-anhydro-5-acetamido-1-(3',5'-di-O-palmitoyl-$\beta$-D-arabinofuranosyl)-cytosine hydrochloride;

$O^2,2'$-anhydro-5-methylamino-1-(3',5'-di-O-palmitoyl-$\beta$-D-arabinofuranosyl)-cytosine hydrochloride;

$O^2,2'$-anhydro-1-(3',5'-di-O-palmitoyl-$\beta$-D-arabinofuranosyl)-5-azacytosine hydrochoride;

$O^2,2'$-anhydro-1-(3',5'-di-O-palmitoyl-$\beta$-D-arabinofuranosyl)-6-azacytosine hydrochloride;

$O^2,2'$-anhydro-$N^4$-methyl-1-(3',5'-di-O-palmitoyl-$\beta$-D-arabinofuranosyl)-cytosine hydrochloride;

$O^2,2'$-anhydro-1-(3',5'-di-O-palmitoyl-$\beta$-D-arabinofuranosyl)-$N^4$-phenylcytosine hydrochloride;

$O^2,2'$-anhydro-1-(3',5'-di-O-palmitoyl-$\beta$-D-arabinofuranosyl)-$N^4$-phenyl-5-trifluoromethylcytosine hydrochloride;

$O^2,2'$-anhydro-1-(3',5'-di-O-palmitoyl-$\beta$-D-arabinofuranosyl)-$N^4$-dimethylcytosine hydrochloride;

$O^2,2'$-anhydro-1-(3',5'-di-O-palmitoyl-$\beta$-D-arabinofuranosyl)-5-aminocytosine hydrochloride;

$O^2,2'$-anhydro-1-(3',5'-di-O-palmitoyl-$\beta$-D-arabinofuranosyl)-5-methyl-6-azacytosine hydrochloride;

$O^2,2'$-anhydro-1-(3',5'-di-O-palmitoyl-$\beta$-D-arabinofuranosyl)-$N^4$-methyl-6-azacytosine hydrochloride;

$O^2,2'$-anhydro-1-(3',5'-di-O-palmitoyl-$\beta$-D-arabinofuranosyl)-$N^4$-dimethyl-6-azacytosine hydrochloride;

$O^2,2'$-anhydro-1-(3',5'-di-O-palmitoyl-$\beta$-D-arabinofuranosyl)-$N^4$-methyl-5-azacytosine hydrochloride; and $O^2,2'$-anhydro-1-(3',5'-di-O-palmitoyl-$\beta$-D-arabinofuranosyl)-$N^4$-dimethyl-5-azacytosine hydrochloride.

Similarly by following the same procedure as above but respectively using myristoyl chloride, stearoyl chloride, behenoyl chloride, oleoyl chloride, chaulmoogroyl chloride, and cerotoyl chloride in place of palmitoyl chloride, the corresponding 3',5'-di-O-myristoyl-; 3',5'-di-O-stearoyl-; 3',5'-di-O-behenoyl-; 3',5'-di-O-oleoyl-; 3',5'-di-O-chaulmoogroyl-; and 3',5'-di-O-cerotoyl- derivatives of each of the above products are respectively prepared.

Example 5

This example illustrates preparation of the compounds of our invention according to the Moffatt procedure referred to herein above. In this example a mixture containing 10 mmoles of $O^2,2'$-anhydro-1-($\beta$-D-arabinofuranosyl)-cytosine hydrochloride and 40 mmoles of behenoyl chloride in 100 ml. of dimethylacetamide is stirred at 80° C. for 2 days. The mixture is then diluted with 500 ml. of ethyl ether, stirred thoroughly and filtered. The residue is washed first with ether and then with several portions of water giving crude $O^2,2'$-anhydro-1-(3',5'-di-O-behenoyl-$\beta$-D-arabinofuranosyl) - cytosine hydrochloride, which is further purified by recrystallization from methanol.

Similarly, by following the same procedure as above but using the corresponding $O^2,2'$-anhydro-1-($\beta$-D-arabinofuranosyl)-cytosine nucleoside hydrochloride salts as starting materials, the following salts are respectively prepared:

$O^2,2'$-anhydro-1-(3',5'-di-O-behenoyl-$\beta$-D-arabinofuranosyl)-5-methylcytosine hydrochloride;

$O^2,2'$-anhydro-1-(3',5'-di-O-behenoyl-$\beta$-D-arabinofuranosyl)-5-fluorocytosine hydrochloride;

$O^2,2'$-anhydro-1-(3',5'-di-O-behenoyl-$\beta$-D-arabinofuranosyl)-5-chlorocytosine hydrochloride;

$O^2,2'$-anhydro-1-(3',5'-di-O-behenoyl-$\beta$-D-arabinofuranosyl)-5-bromocytosine hydrochloride;

$O^2,2'$-anhydro-1-(3',5'-di-O-behenoyl-$\beta$-D-arabinofuranosyl)-5-iodocytosine hydrochloride;

19

O²,2'-anhydro-1-(3',5'-di-O-behenoyl-β-arabino-
 furanosyl)-5-behenoyloxymethylcytosine hydro-
 chloride;
O²,2'-anhydro-1-(3',5'-di-O-behenoyl-β-D-arabino-
 furanosyl)-5-(α-behenoyloxyethyl)-cytosine hydro-
 chloride;
O²,2'-anhydro-1-(3',5'-di-O-behenoyl-β-D-arabino-
 furanosyl)-5-trifluoromethylcytosine hydrochloride;
O²,2'-anhydro-1-(3',5'-di-O-behenoyl-β-D-arabino-
 furanosyl)-5-azidocytosine hydrochloride;
O²,2'-anhydro-1-(3',5'-di-O-behenoyl-β-D-arabino-
 furanosyl)-5-nitrocytosine hydrochloride;
O²,2'-anhydro-1-(3',5'-di-O-behenoyl-β-D-arabino-
 furanosyl)-5-acetamidocytosine hydrochloride;
O²,2'-anhydro-1-(3',5'-di-O-behenoyl-β-D-arabino-
 furanosyl)-5-methylaminocytosine hydrochloride;
O²,2'-anhydro-1-(3',5'-di-O-behenoyl-β-D-arabino-
 furanosyl)-5-azacytosine hydrochloride;
O²,2'-anhydro-1-(3',5'-di-O-behenoyl-β-D-arabino-
 furanosyl)-6-azacytosine hydrochloride;
O²,2'-anhydro-1-(3',5'-di-O-behenoyl-β-D-arabino-
 furanosyl)-N⁴-methylcytosine hydrochloride;
O²,2'-anhydro-1-(3',5'-di-O-behenoyl-β-D-arabino-
 furanosyl)-N⁴-phenylcytosine hydrochloride;
O²,2'-anhydro-1-(3',5'-di-O-behenoyl-β-D-arabino-
 furanosyl)-N⁴-phenyl-5-trifluoromethylcytosine
 hydrochloride;
O²,2'-anhydro-1-(3',5'-di-O-behenoyl-β-D-arabino-
 furanosyl)-N⁴-dimethylcytosine hydrochloride;
O²,2'-anhydro-1-(3',5'-di-O-behenoyl-β-D-arabino-
 furanosyl)-5-aminocytosine hydrochloride;
O²,2'-anhydro-1-(3',5'-di-O-behenoyl-β-D-arabino-
 furanosyl)-5-methyl-6-azacytosine hydrochloride;
O²,2'-anhydro-1-(3',5'-di-O-behenoyl-β-D-arabino-
 furanosyl)-N⁴-methyl-6-azacytosine hydrochloride;
O²,2'-anhydro-1-(3',5'-di-O-behenoyl-β-D-arabino-
 furanosyl)-N⁴-dimethyl-6-azacytosine hydrochloride;
O²,2'-anhydro-1-(3',5'-di-O-behenoyl-β-D-arabino-
 furanosyl)-N⁴-methyl-5-azacytosine hydrochloride; and
O²,2'-anhydro-1-(3',5'-di-O-behenoyl-β-D-arabino-
 furanosyl)-N⁴-dimethyl-5-azacytosine hydrochloride.

Similarly, by following the same procedure as above but respectively replacing behenoyl chloride with cerotoyl chloride, the corresponding 3',5'-di-O-cerotoyl analogs of each of the above enumerated products are respectively prepared.

The above procedures are again repeated but in this instance, in place of the hydrochloride salt nucleoside starting material, the following salts are respectively used as starting material, hydroiodide, maleate, bromide, sulfate, thereby affording the corresponding 3',5'-di-O-acyl salts. However, in this instance the product is a mixture of hydrochloride salts and the type salt used as nucleoside starting material.

Example 6

This example illustrates methods of preparing 3'-O-acyl-5'-O-acyl derivatives of the invention according to the Moffatt procedure. In this example a mixture containing 1 mmole of O²,2'-anhydro-1-(3',O-acetyl-β-D-arabinofuranosyl)-cytosine hydrochloride and 6 mmoles of stearoyl chloride in 10 ml. of dimethylacetamide is stirred at 37° C. for 15 hours. The mixture is then diluted with 100 ml. of ethyl ether and the precipitate of crude 3'-O-acetyl-O²,2'-anhydro-5'-O-stearoyl-1 - (β-D-arabinofuranosyl)-cytosine hydrochloride is recovered by filtration and then further purified by recrystallization from methanol.

Similarly, by following the same procedure as about but respectively using the 3'-O-acyl nucleoside products, prepared according to Preparations 1, 2, and 3 as starting material, the corresponding 3'-O-acyl-5'-O-stearoyl derivatives are respectively prepared.

Similarly, by following the same procedure as above but respectively using oleoyl chloride and cerotoyl chloride in place of stearoyl chloride, the corresponding 3'-O-acyl-5'-O-oleoyl- and 3'-acyl-5'-O-cerotoyl- derivatives of each of the above products are respectively prepared.

Example 7

This example illustrates methods of preparing 3'-O-acyl-5'-O-acyl derivatives of the invention according to the Moffatt procedure. In this example a mixture containing 1 mmole of O²,2' - anhydro - 1- (3'-O-behenoyl-β-D-arabinofuranosyl)-cytosine hydrochloride and 6 mmoles of propionyl chloride in 10 ml. of dimethylacetamide is stirred at room temperature for 15 hours. The mixture is then diluted with 100 ml. of ethyl ether and the precipitate of crude O²,2'-anhydro-1-(3'-O-behenoyl-5'-O-propionyl-β-D-arabinofuranosyl)-cytosine hydrochloride, which is recovered by filtration and then further purified by recrystallization from ethanol.

Similarly, by following the same procedure as above but respectively using the 3'-O-acyl nucleoside products, prepared according to Example 1, as starting material, the corresponding 3'-O-acyl-5'-O-propionyl derivatives are respectively prepared.

Similarly, by following the same procedure as above but respectively using acetyl chloride, isobutyryl chloride, octanoyl chloride, benzoyl chloride, phenylacetyl chloride, and p - methylbenzoyl chloride in place of propionyl chloride, the corresponding 3'-O-acyl-5'-acetyl-; 3'-O-acyl-5'-O-isobutyryl-; 3'-O-acyl-5'-O-octanoyl-; 3'-O-acyl-5'-O-benzoyl-; 3'-O-acyl-5'-O-phenylacetyl-; and 3'-O-acyl-5'-O-p-methylbenzoyl- analogs of each of the above products are respectively prepared.

Example 8

This example illustrates methods of preparing 3'-O-acyl-5'-O-acyl- derivatives of the invention according to the Moffatt procedure. In this example a suspension containing 1 mmole of O²,2'-anhydro-1-(3'-O-behenoyl-β-D-arabinofuranosyl)-cytosine hydrochloride and 4 mmoles of adamantoyl chloride in 20 ml. of dimethylacetamide is stirred at room temperature for 20 days and then evaporated to dryness under vacuum. The residue is triturated several times with ethyl ether and then with ethyl acetate. The resulting material is then crystallized from a mixture of chloroform and ethyl acetate yielding pure O²,2'-anhydro-1-(3'-O-behenoyl-5' - O - adamantoyl-β-D-arabinofuranosyl)-cytosine hydrochloride.

Similarly, by following the same procedure as above but respectively using the 3'-O-acyl nucleoside products, prepared according to Example 1, as starting materials, the corresponding 3'-O-acyl-5'-O-adamantoyl- derivatives are respectively prepared.

Similarly, by following the same procedure as above but respectively using myristoyl chloride, stearoyl chloride, behenoyl chloride, oleoyl chloride, chaulmoogroyl chloride, palmitoyl chloride and 4-methylbicyclo[2,2,2]-oct-2-enylcarbonyl chloride in place of propionyl chloride, the corresponding 3'-O-acyl-5'-O-myristoyl-; 3'-O-acyl-5'-O-stearoyl-; 3'-O-acyl-5' - O - behenoyl-; 3'-O-acyl-5'-O-oleoyl-; 3'-O-acyl-5'-O-chaulmoogroyl-; 3' - O - acyl-5'-O-palmitoyl-; and 3'-O-acyl-5'-O-4-methylbicyclo[2,2,2]-oct-2-enylcarbonyl-derivatives of each of the above products are respectively prepared.

Example 9

This example illustrates an ion exchange procedure for preparing other pharmaceutically acceptable salts of the invention. In this example a solution of 2 g. of O²,2'-anhydro-1-(3'-O-behenoyl - β - D-arabinofuranosyl)-cytosine hydrochloride in warm methanol is passed through a column containing 20 ml. of ion exchange resin in the acetate form, sold under the trademark Dowex 50.

The effluent and washings are then evaporated to dryness and crystallized from ethanol giving O²,2'anhydro-1-(3'-O-behenoyl-β-D-arabinofuranosyl)-cytosine acetate.

Similarly, by following the same procedure respectively using the hydrochloride salt products of Examples 1 through 8 as starting materials, the corresponding acetate salts are respectively prepared.

Example 10

This example illustrates a method according to our invention of preparing the fluoride, iodide and other pharmaceutically acceptable salts of our invention. In this example a warm methanol solution containing 1 g. of O²,2'-anhydro-1-(3'-O-behenoyl-β-D-arabinofuranosyl) - cytosine hydrochloride is passed through a column containing 20 ml. of a quaternary ammonium ion exchange resin (i.e., Dowex (—1)) in the fluoride salt forms. The resulting effluent and water washes thereof are combined and evaporated to dryness. The resulting residue is then recrystallized from methanol by the addition of acetone, affording O²,2'-anhydro-1-(3'-O-behenoyl - β - D-arabinofuranosyl)-cytosine hydrofluoride.

Similarly by applying the above procedure to the corresponding hyrdochloride products of Examples 1 through 8, the corresponding hydrofluoride salts are prepared.

By following the above procedure but using, respectively, iodide, sulfate, phosphate, acetate and lactate anion forms of the exchange resin, the corresponding hydroiodide, sulfate, phosphate, acetate and lactate salts are respectively prepared.

Example 11

This example illustrates a method according to the invention of hydrolyzing compounds of the invention into the corresponding 1-(β-D-arabinofuranosyl)-cytosines. In this example 1 g. of O²,2'-anhydro-1-(3'-O-behenoyl-β-D-arabinofuranosyl)-cytosine is added to 50 ml. of methanol at room temperature. 5 ml. of 6 N aqueous ammonium hydroxide is then added and the resulting mixture stirred at room temperature until thin-layer chromographic analysis reveals complete hydrolysis. The solution is then evaporated to dryness and the resulting residue partitioned between water and chloroform. The water phase is passed through a column containing 10 ml. of ion exchange resin (H+ form), sold under the trademark Dowex 50. The column is first washed with methanol and then with water. After washing, the column is eluted with 2 N aqueous ammonium hydroxide. The product fractions are combined and evaporated to dryness and the resulting residue dissolved and crystallized from ethanol affording 1-(β-D-arabinofuranosyl)-cytosine.

Obviously many modifications and variations of the invention, described herein above and below in the claims, can be made without departing from the essence and scope thereof.

What is claimed is:

1. A compound selected from the group having the formulas:

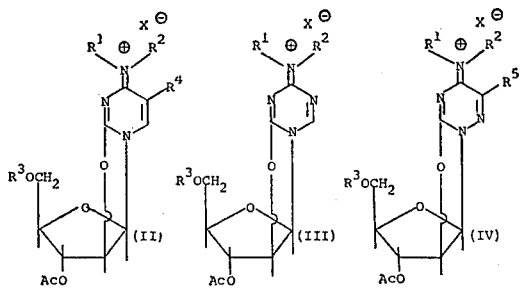

wherein $R^1$ and $R^2$ are independently selected from the group of hydrogen, lower alkyl, aryl having from six to 20 carbon atoms, or lower alkylaryl having up to 30 carbon atoms; $R^{1'}$ and $R^{2'}$ are independently selected from the group of hydrogen and lower alkyl; Ac is a pharmaceutically acceptable acyl group having from 2 through 30 carbon atoms; $R_3$ is hydrogen or pharmaceutically acceptable acyl group having from 2 through 30 carbon atoms and wherein when Ac is an acyl group having from 2 through 21 carbon atoms then $R^3$ is a pharmaceutically acceptable acyl group having from 13 through 30 carbon atoms, and wherein when $R^3$ is H or an acyl group having from 2 through 12 carbon atoms then Ac is a pharmaceutically acceptable acyl group having from 22 through 30 carbon atoms; $R^4$ is hydrogen, halo, lower alkyl, lower hydroxyalkyl, trifluoromethyl, azido, nitro, amino, lower alkylamino, lower dialkylamino or the group having the formula

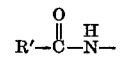

wherein R' is hydrogen, alkyl groups having from one through 10 carbon atoms, aryl having six to 20 carbon atoms, or alkylaryl having up to 30 carbon atoms; $R^5$ is hydrogen or methyl; and X is a pharmaceutically acceptable anion.

2. The compound of claim 1 wherein X is a chloride anion.

3. The compound of claim 1 wherein Ac is a pharmaceutically acceptable acyl group having from 22 through 30 carbon atoms.

4. The compound of claim 1 wherein $R^3$ is a pharmaceutically acceptable acyl group having from 13 through 30 carbon atoms.

5. The compound of claim 4 wherein Ac is a pharmaceutically acceptable acyl group identical to $R^3$.

6. The compound of claim 1 of Formula II wherein $R^1$, $R^2$ and $R^4$ are each hydrogen.

7. The compound of claim 6 wherein said compound is selected from the group consisting of the pharmaceutically acceptable salts of O²,2'-anhydro-1-(3'-O-behenoyl-β-D-arabinofuranosyl)-cytosine;

O²,2'-anhydro-1-(3'-O-lignoceroyl-β-D-arabinofuranosyl)-cytosine; and

O²,2'-anhydro-1-(3'-O-cerotoyl-β-D-arabinofuranosyl)-cytosine.

8. The compound of claim 6 wherein said compound is selected from the group consisting of the pharmaceutically acceptable salts of O²,2'-anhydro-1-(3',5'-di-O-myristol-β-D-arabinofuranosyl)-cytosine;

O²,2'-anhydro-1-(3',5'-di-O-palmitoyl-β-D-arabinofuranosyl)-cytosine;

O²,2'-anhydro-1-(3',5'-di-O-stearoyl-β-D-araboinofuranosyl)-cytosine;

O²,2'-anhydro-1-(3',5'-di-O-oleoyl-β-D-arabinofuranosyl)-cytosine;

O²,2'-anhydro-1-(3',5'-di-O-arachidoyl-β-D-arabinofuranosyl)-cytosine;

O²,2'-anhydro-1-(3',5'-di-O-behenoyl-β-D-arabinofuranosyl)-cytosine;

O²,2'-anhydro-1-(3',5'-di-O-cerotoyl-β-D-arabinofuranosyl)-cytosine;

O²,2'-anhydro-1(3',5'-di-O-chaulmoogroyl-β-D-arabinofuranosyl)-cytosine; and

O²,2'-anhydro-1-(3',5'-di-O-lignoceroyl-β-D-arabinofuranosyl)-cytosine.

9. The compound of claim 1 wherein Ac is selected from the group consisting of acetyl and propionyl.

10. The compound of claim 9 wherein said compound is selected from the group consisting of the pharmaceutically acceptable salts of O²,2'-anhydro-1-(3'-O-acetyl-5'-O-myristoyl-β-D-arabinofuranosyl)-cytosine;

O²,2'-anhydro-1-(3'-O-acetyl-5'-O-palmitoyl-β-D-arabinofuranosyl)-cytosine;

$O^2,2'$-anhydro-1-(3'-O-acetyl-5'-O-stearoyl-β-D-arabinofuranosyl)-cytosine;

$O^2,2'$-anhydro-1-(3'-O-acetyl-5'-O-chaulmoogroyl-β-D-arabinofuranosyl)-cytosine;

$O^2,2'$-anhydro-1-(3'-O-acetyl-5'-O-behenoyl-β-D-arabinofuranosyl)-cytosine;

$O^2,2'$-anhydro-1-(3'-O-acetyl-5'-O-arachidoyl-β-D-arabinofuranosyl)-cytosine;

$O^2,2'$-anhydro-1-(3'-O-acetyl-5'-O-lignoceroyl-β-D-arabinofuranosyl)-cytosine; and $O^2,2'$-anhydro-1-(3'-O-acetyl-5'-O-cerotoyl-β-D-arabinofuranosyl)-cytosine;

References Cited

UNITED STATES PATENTS

| | | | |
|---|---|---|---|
| 3,463,850 | 8/1969 | Shen et al. | 260—211.5 R |
| 3,658,788 | 4/1972 | Orgel et al. | 260—211.5 R |
| 3,709,874 | 1/1973 | Moffatt et al. | 260—211.5 R |

JOHNNIE R. BROWN, Primary Examiner

U.S. Cl. X.R.

424—180

UNITED STATES PATENT AND TRADEMARK OFFICE
CERTIFICATE OF CORRECTION

PATENT NO. : 3,792,040
DATED : February 12, 1974
INVENTOR(S) : JOHN G. MOFFATT ET AL It is certified that error appears in the above–identified patent and that said Letters Patent are hereby corrected as shown below:

Column 2, lines 59-62, "  " should read -- 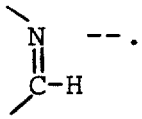 --.

Column 7, line 40, "2 hours" should read -- 12 hours --.

Column 21, lines 57-60, that portion of formulas (III) and (IV)

" 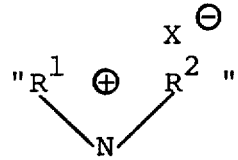 " should read -- 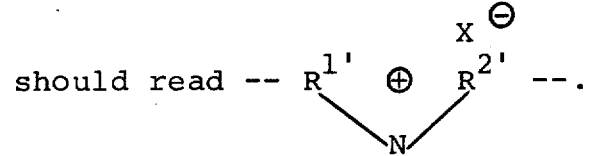 --.

Signed and Sealed this

Fifteenth Day of February 1977

[SEAL]

Attest:

RUTH C. MASON
*Attesting Officer*

C. MARSHALL DANN
*Commissioner of Patents and Trademarks*